United States Patent
Pietilae et al.

(10) Patent No.: US 11,762,143 B2
(45) Date of Patent: Sep. 19, 2023

(54) WAVEGUIDE DISPLAY ASSEMBLY

(71) Applicant: Microsoft Technology Licensing, LLC, Redmond, WA (US)

(72) Inventors: Pasi Petteri Pietilae, Espoo (FI); Tuomas Heikki Sakari Vallius, Kirkland, WA (US); Jani Kari Tapio Tervo, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 17/338,447

(22) Filed: Jun. 3, 2021

(65) Prior Publication Data

US 2022/0390666 A1    Dec. 8, 2022

(51) Int. Cl.
| | | |
|---|---|---|
| G02B 27/01 | (2006.01) | |
| G02B 27/00 | (2006.01) | |
| G02B 27/42 | (2006.01) | |
| F21V 8/00 | (2006.01) | |

(52) U.S. Cl.
CPC ......... G02B 6/0076 (2013.01); G02B 6/0016 (2013.01); G02B 6/0036 (2013.01); G02B 27/00 (2013.01); G02B 27/0081 (2013.01); G02B 27/0172 (2013.01); G02B 27/4272 (2013.01); *G02B 2027/0112* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 2018/0231771 | A1 | 8/2018 | Schuck et al. |
| 2019/0212557 | A1* | 7/2019 | Waldern ............. G02B 27/0101 |
| 2020/0292840 | A1 | 9/2020 | Popovich et al. |
| 2021/0124170 | A1 | 4/2021 | Lee |

FOREIGN PATENT DOCUMENTS

| | | | | |
|---|---|---|---|---|
| WO | WO-2016098329 A1 * | 6/2016 | ............... | B32B 3/12 |
| WO | 2017120341 A1 | 7/2017 | | |

OTHER PUBLICATIONS

Kawashita et al., Machine Translation of WO-2016098329-A1, Jun. 2016. (Year: 2016).*
"International Search Report and Written Opinion Issued in PCT Application No. PCT/US22/028407", dated Aug. 22, 2022, 14 Pages.

* cited by examiner

Primary Examiner — Michelle R Connelly
(74) *Attorney, Agent, or Firm* — Alleman Hall Creasman & Tuttle LLP (57) ABSTRACT

A waveguide display assembly comprises a waveguide, including an in-coupling grating configured to in-couple light of a first wavelength band emitted by a light source into the waveguide, and cause propagation of the light of the first wavelength band through the waveguide via total internal reflection. An out-coupling grating is configured to out-couple the light of the first wavelength band from the waveguide and toward a user eye. One or more diffractive gratings are disposed along an optical path between the in-coupling grating and the out-coupling grating, the one or more diffractive gratings configured to diffract light outside the first wavelength band out of the waveguide and away from the user eye.

19 Claims, 5 Drawing Sheets

WAVEGUIDE DISPLAY ASSEMBLY

BACKGROUND

Some display devices use waveguides to steer light from a light source toward a user eye. In some cases, different waveguides may be used for different wavelengths of light.

DETAILED DESCRIPTION

Figure 1:
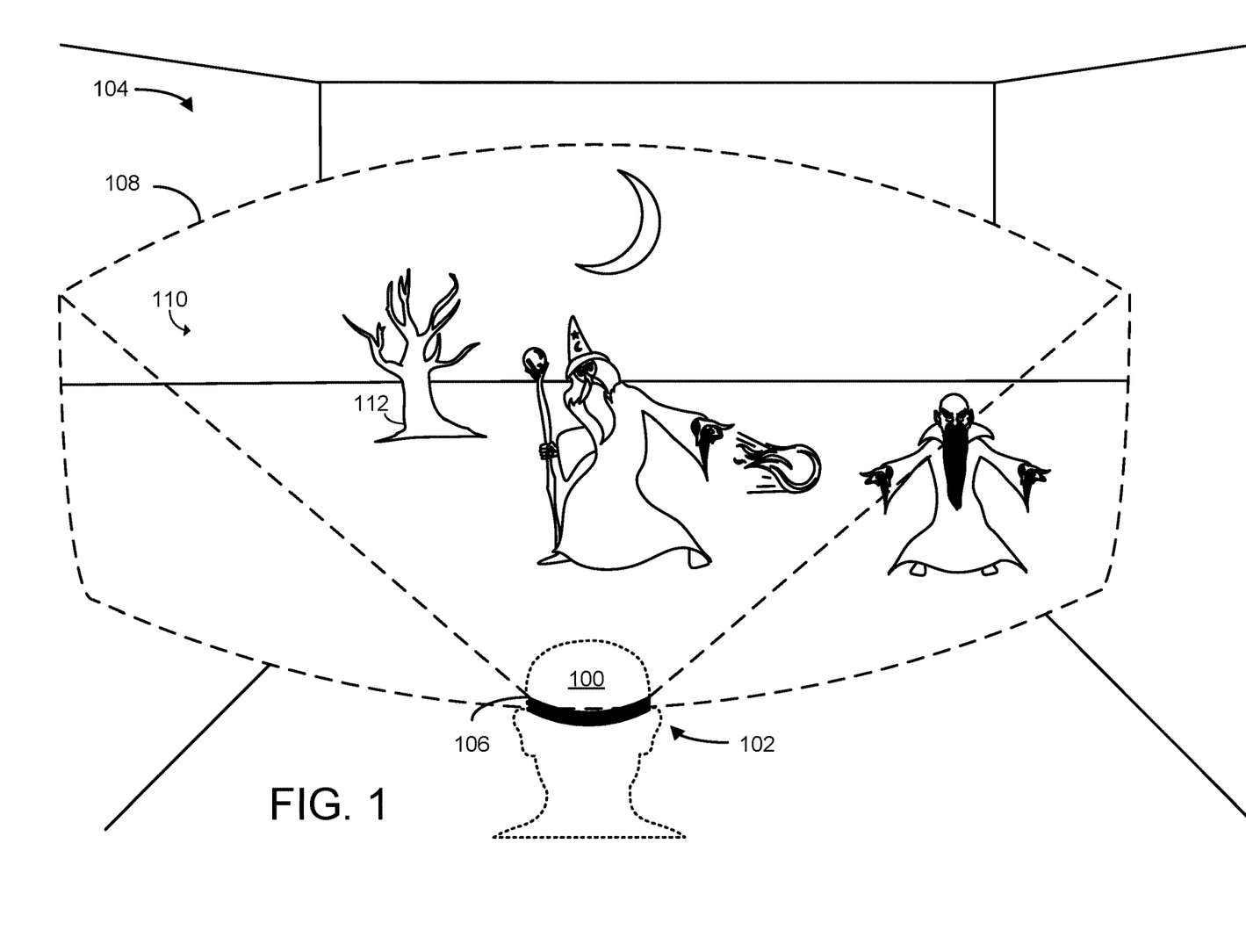
FIG. 1 schematically illustrates use of a head-mounted display device (HMD).

Waveguides may be used in a variety of different display contexts for directing light toward a user eye. For instance, FIG. 1 schematically shows a user 100 using a head-mounted display device (HMD) 102 in a real-world environment 104. As will be described in more detail below, HMD may include one or more waveguide display assemblies configured to direct light toward one or more user eyes—e.g., the light may form a virtual image viewable by a user eye.

HMD 102 includes a waveguide display assembly 106 integrated into a near-eye display device of the HMD. Via the near-eye display, user 100 has a field-of-view 108 of a virtual environment 110. The virtual environment is presented as a series of virtual image frames visible to the eyes of the user via the near-eye display, such that the user's view of their surrounding real-world environment is partially, or entirely, augmented or replaced by virtual content (e.g., the near-eye display may include two waveguide display assemblies, each configured to direct virtual image light toward a different user eye). Virtual environment 110 includes a virtual tree 112, which is a computer-generated representation of a tree that does not exist in the real-world, as well as a virtual landscape that differs from the user's real-world surroundings.

The present disclosure primarily focuses on waveguide display assemblies in the context of a near-eye display device of a HMD—e.g., a device that provides virtual imagery that augments or replaces the user's view of their own real-world environment. This may include fully virtual scenarios, in which the user's view of their real-world environment is substantially replaced by computer-generated imagery. Waveguide display assemblies may also be used in augmented reality settings, in which the real-world remains at least partially visible to the user—e.g., via a partially transparent display, live video feed, or other approach. It will be understood, however, that waveguide display assemblies as described herein may be used in any scenario in which a waveguide is used to direct light from a light source toward a user eye. As another example, waveguide display assemblies may be used to provide head-up displays (HUDs) in vehicle windscreens, eyeglasses, and/or other suitable contexts.

In any case, a waveguide display assembly as described herein may be integrated into, or otherwise used with, any suitable computing device having any suitable capabilities, form factor, and hardware configuration. As one example, a waveguide display assembly may be used with, or otherwise controlled by, computing system 500 described below with respect to FIG. 5.

In designing display devices that incorporate waveguides, it is sometimes desirable to use multiple waveguides corresponding to different wavelength bands of light. For example, a display device may direct image light toward a user eye using a combination of three or more different waveguides—e.g., one waveguide for red wavelengths of light, one for blue wavelengths of light, and one for green wavelengths of light. Each different waveguide may have a suitable optical element (e.g., an in-coupling grating) configured to accept (or "in-couple) light of an intended wavelength band while rejecting at least some light outside the intended wavelength band.

However, though different wavelength bands of light may be intended for different waveguides, some amount of cross-coupling often occurs, in which different wavelength bands of light enter and propagate through the same waveguide. This may occur, for example, due to overlap between the wavelengths of light accepted by different in-coupling gratings of different waveguides. For example, while one waveguide may have an in-coupling grating that selectively accepts a first wavelength band of light (e.g., blue light), and a second waveguide may have an in-coupling grating that selectively accepts a second wavelength band of light (e.g., green light), there may be some amount of overlap between these two wavelength bands. This may cause some amount of green light to be in-coupled into the blue waveguide, and some amount of blue light to be in-coupled into the green waveguide, as examples. Similarly, blue and/or green light may be in-coupled into a red waveguide, and red light may be in-coupled into either or both of the blue and green waveguides. This can negatively affect any images displayed to the user eye—e.g., causing a loss of clarity, color uniformity problems, and/or other undesirable artifacts.

Accordingly, the present disclosure is directed to a waveguide display assembly that includes additional diffractive grating elements disposed along a waveguide. The diffractive grating elements are configured to mitigate the negative effects of cross-coupling of different wavelength bands of light into the waveguide. Specifically, the diffractive grating elements may selectively diffract one or more wavelength bands of light out of the waveguide, while allowing one or more other wavelength bands of light to continue propagating within the waveguide. In this manner, light of an intended wavelength band (e.g., blue light) may be in-coupled into the waveguide and propagate toward an out-coupling element, which directs the light toward a user eye. Any unintended wavelength bands (e.g., red and/or green light) may still be in-coupled to some extent, although much of this unintended light may be diffracted out by the diffractive grating elements, instead of being out-coupled toward the user eye. In this manner, a waveguide display assembly may provide clearer and more accurate images to a user eye, without significantly increasing the weight, size, or complexity of the overall device.

Figure 2:
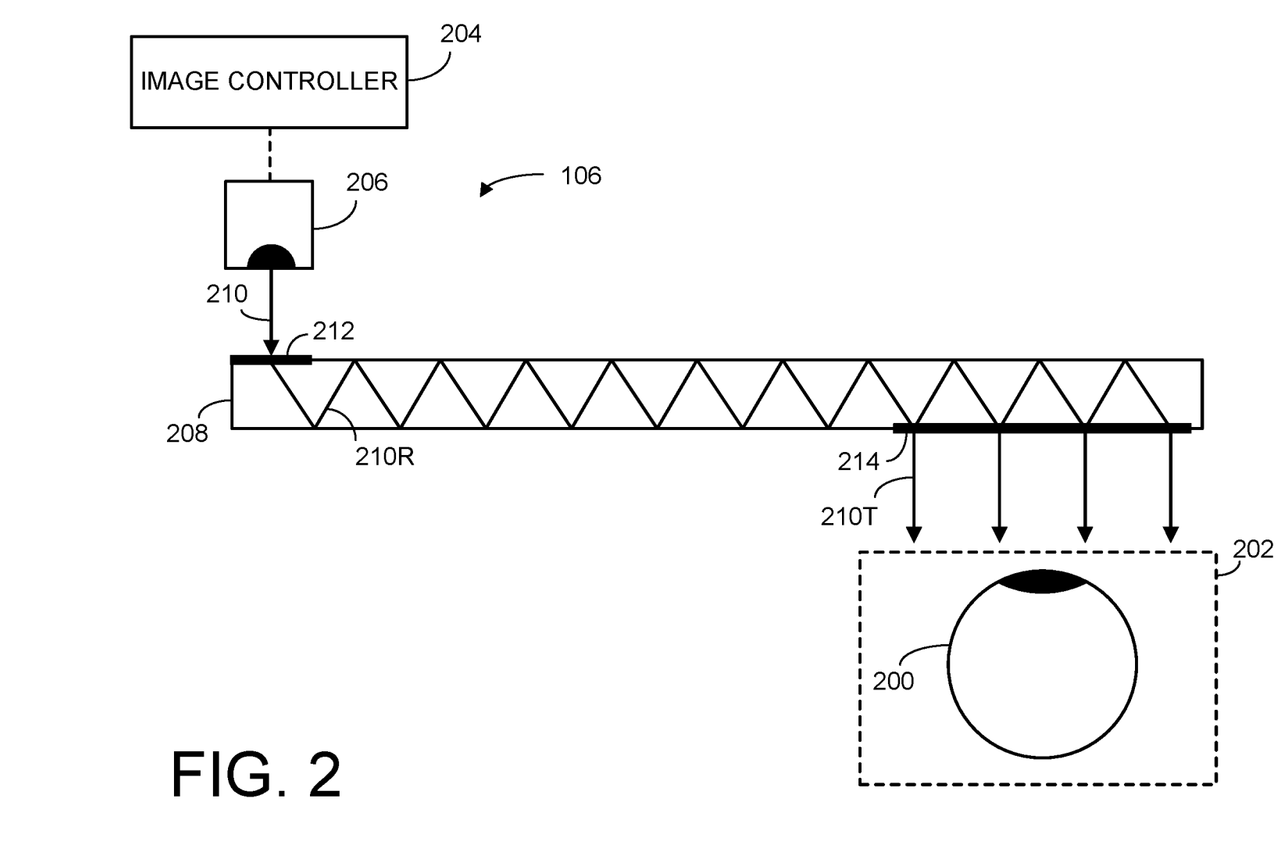
FIG. 2 schematically illustrates use of an example waveguide display assembly to direct light toward a user eye.

FIG. 2 schematically shows waveguide display assembly 106 in more detail. Waveguide display assembly 106 is in the process of directing light toward a user eye 200 for viewing. In some cases, waveguide display assembly 106 may be one of two or more different waveguide display assemblies in the same display device. For example, HMD 102 may include a second waveguide display assembly that is similar to waveguide display assembly 106 and configured to direct light toward a second user eye. In other examples, a device need only include one waveguide display assembly—e.g., for directing light toward a single user eye, or two user eyes at once.

Figure 3:
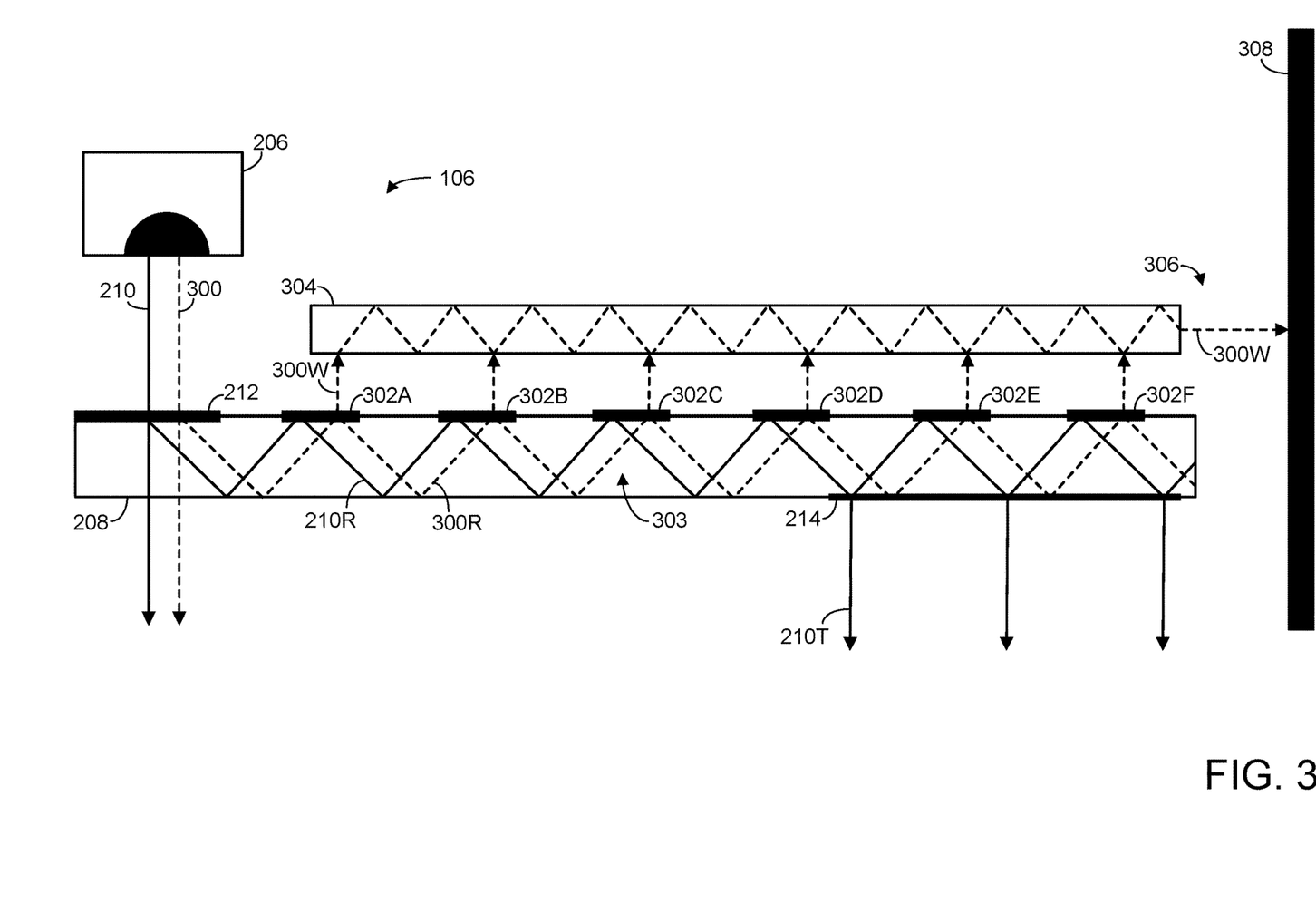
FIG. 3 schematically depicts the example waveguide display assembly of FIG. 2 in more detail.
Figure 4:
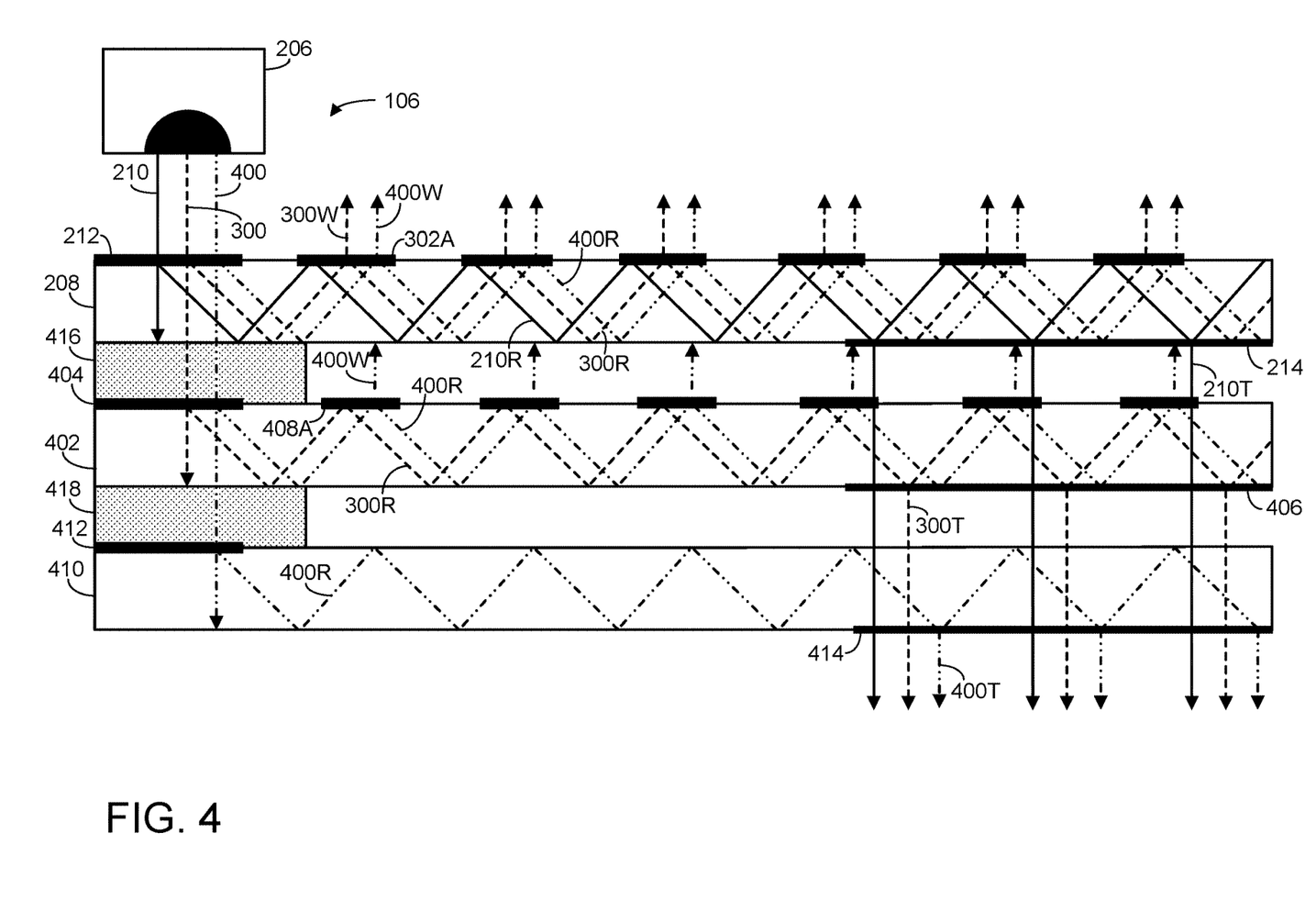
FIG. 4 schematically depicts the example waveguide display assembly of FIG. 2 in more detail.
Figure 5:
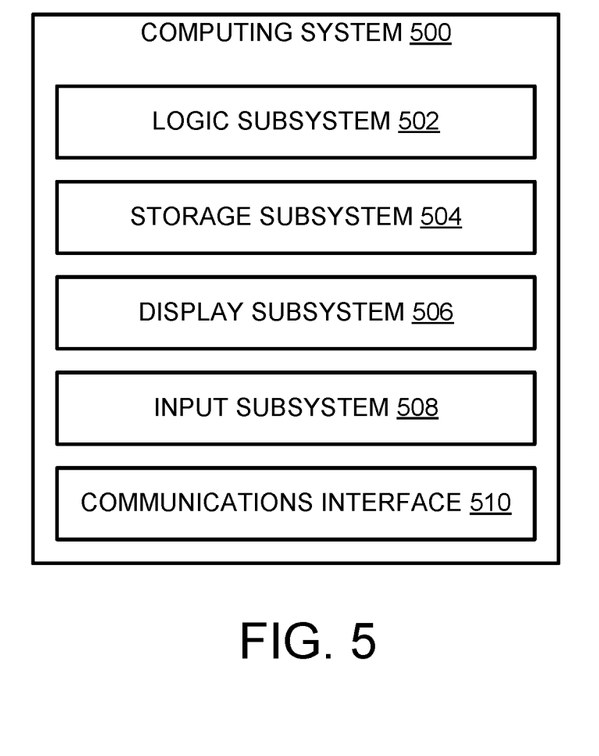
FIG. 5 schematically shows an example computing system.

It will be understood that FIG. 2 is highly simplified for the sake of illustration. The example waveguide display assembly is shown schematically and is not drawn to scale. FIGS. 3, 4, and 5 are similarly schematic in nature.

In FIG. 2, use eye 200 is shown relative to an eyebox 202. An "eyebox" refers to a region of space defining a field-of-view in which a user eye can receive virtual images generated by a display device with acceptable quality. As will be described in more detail below, optical components of the waveguide display assembly may serve to perform pupil expansion, in which a relatively small exit pupil of light emitted by a light source is expanded to a larger size. This allows for a larger eyebox in which images formed by the light are viewable. A larger eyebox can enable a larger field-of-view for the user, and can also allow the display device to be used by a wider population of users (e.g., having different eye shapes, sizes, and spacings) without requiring extensive adjustment or calibration.

Waveguide display assembly 106 includes an image controller 204 communicatively coupled with a light source 206. Image controller 204 is configured to control activity of the light source. For example, based on instructions from image controller 204, light source 206 may emit light toward a waveguide that forms a virtual image for viewing by user eye 200. The light emitted by the light source may be updated at any suitable rate—e.g., a refresh rate of 60 frames-per-second (FPS), 90FPS, or 120FPS.

The image controller may take any suitable form. For example, the image controller may be implemented as a suitable computer processor, application-specific integrated circuit (ASIC), or other computer logic hardware. In some examples, image controller 204 may be implemented as logic subsystem 502 described below with respect to FIG. 5.

Light source 206 may include one or more light-emitting diodes (LEDs) or lasers, as non-limiting examples. In some cases, light source 206 may include suitable components for spatially modulating light emitted by the light source such that the light forms a virtual image. Light source 206 may be configured to output light at one fixed angle, or at any of a range of angles. For example, the light source may in some cases include a steerable micromirror, and/or other suitable elements for controlling the angle of the mitted light. The light source may include any suitable elements for focusing, or otherwise modifying the optical power of, light emitted by the light source—e.g., the light source may include one or more suitable lenses or dynamic elements (e.g., dynamic digital holograms). Additionally, or alternatively, such optical focusing elements may be disposed elsewhere in the waveguide display assembly along the optical path between the light source and user eye.

It will be understood that, in general, the light source may include any suitable optics and other components for emitting light, and such light may be emitted at any suitable time and for any suitable reason. The term "light source" as used herein refers to any structures and components suitable for emitting light toward a waveguide.

Waveguide display assembly 106 also includes a waveguide 208. Light source 206 is emitting light 210 toward waveguide 208, which serves to steer the light and facilitate its viewing by user eye 200. Specifically, waveguide 208 includes an in-coupling grating configured to in-couple light emitted by light source 206 into the waveguide. Once in-coupled, the light may propagate through the waveguide via total internal reflection, indicated in FIG. 2 by the repeated reflections of light within waveguide 208. It will be understood that light may propagate within the waveguide at any suitable reflection angle.

In FIG. 2, and in other FIGS. described herein, different reference numerals are used to refer to light at different points along the optical path between the light source and the user eye. Specifically, after being in-coupled to waveguide 208, light 210 is labeled as 210R. After being out-coupled from the waveguide and directed toward user eye 200, light 210 is labeled as 210T.

In some examples, waveguide 208 may have a geometry other than the flat, rectangular shape shown in FIG. 2. For example, the waveguide may have the shape of a wedge or a curved wedge. In general, waveguide 208 and other waveguides described herein may each have any suitable shapes, sizes, and geometries. Furthermore, the waveguides described herein may be constructed from any suitable materials—e.g., suitable dielectric glasses or plastics may be used.

In-coupling grating 212 may take any suitable form. In general, the in-coupling grating takes the form of a physical pattern that is printed or etched onto the surface of the waveguide in a manner that alters the path of light passing through the in-coupling grating (e.g., via diffraction or reflection). The optical properties of the in-coupling grating may depend on the spatial frequency of the gratings, an incident angle of the gratings, and/or the geometry of the individual gratings (e.g., thickness, size, curved gratings vs a sawtooth pattern), as non-limiting examples. For the purposes of this disclosure, an "in-coupling grating" refers to an optical element on the surface of a waveguide that accepts at least some light incident on the in-coupling grating into a waveguide, in which the light begins propagating via total internal reflection.

After being in-coupled to waveguide 208, light 210R propagates via a series of internal reflections until reaching an out-coupling grating 214 configured to out-couple the light from the waveguide and toward user eye 200. As with the in-coupling grating, the out-coupling grating may take any suitable form, but may often be implemented as a physical pattern that is printed or etched onto the surface of the waveguide in a manner that alters the path of light passing through the out-coupling grating (e.g., via diffraction or reflection). Again, optical properties of the out-coupling grating may depend on the spatial frequency of the gratings, an incident angle of the gratings, and/or the geometry of the individual gratings, as non-limiting examples. For the purposes of this disclosure, an "out-coupling grating" refers to an optical element on the surface of a waveguide that accepts at least some light incident on the out-coupling grating and directs it out of the waveguide—e.g., toward a user eye.

In some cases, the in-coupling grating may be at least partially wavelength-selective. For example, light 210 may specifically include light of a first wavelength band, while excluding other wavelengths of visible light. The in-coupling grating may be configured to selectively in-couple light of the first wavelength band (e.g., blue light) while rejecting at least some light outside the first wavelength band (e.g., red and/or green light). As will be described in more detail below, the waveguide display assembly may in some cases include additional waveguides having additional in-coupling gratings, configured to in-couple light of other wavelength bands. Thus, for example, the waveguide display assembly may include three different waveguides, one each for blue light, red light, and green light.

However, an in-coupling grating may not in-couple all of the light of its intended wavelength band, and similarly may not reject all of the light outside its intended wavelength band. For example, in the case where in-coupling grating 212 is configured to in-couple blue wavelengths of light, some amount of blue light may pass through the in-coupling grating without being in-coupled into the waveguide. Instead, some amount of blue light may continue toward other waveguides of the waveguide display assembly, as will be described in more detail below. Similarly, some amount of red and/or green light may be in-coupled into waveguide 208, and ultimately out-coupled toward the user eye, which can negatively affect a virtual image formed by the emitted light.

Accordingly, as discussed above, a waveguide display assembly may in some cases include additional diffractive gratings configured to mitigate the cross-coupling of light of different wavelength bands into the same waveguide. This is illustrated with respect to FIG. 3, again schematically showing waveguide display assembly 106. However, FIG. 3 provides a more detailed view of the waveguide display assembly, in which additional components are depicted that were not shown in FIG. 2.

Specifically, in FIG. 3, light source 206 is emitting two different wavelength bands of light, including light 210 of a first wavelength band, and light 300 of a second wavelength band. The first wavelength band may, for example, correspond to blue light, while the second wavelength band corresponds to green light, and/or the two different wavelength bands may correspond to any other suitable wavelengths of visible light (or other non-visible electromagnetic radiation). While FIG. 3 depicts these two wavelength bands of light as different, spatially-separate emissions of light, it will be understood that this is done only for the sake of illustration. In practical applications, the two different wavelength bands of light may be emitted from the light source as a single beam (e.g., a beam of white light emitted by an LED). Alternatively, the light source may include multiple wavelength-specific light emitters—e.g., a laser that emits blue light, and a laser that emits green light.

Regardless, as shown, both light 210 and light 300 are incident on in-coupling grating 212 of waveguide 208. In-coupling grating 212 is configured to selectively in-couple light of the first wavelength band (e.g., light 210), while rejecting at least some light outside of the first wavelength band (e.g., light 300). In FIG. 3, some amount of light 210 is in-coupled into the waveguide and begins propagating via total internal reflection as light 210R, as discussed above. However, some amount of light 210 also passes through the in-coupling grating without being in-coupled into the waveguide. Similarly, some amount of light 300 ends up in-coupled into waveguide 208 and propagating via total internal reflection as light 300R, even as much of light 300 is rejected by the in-coupling grating and is not in-coupled into the waveguide. In the event that light 300 is out-coupled toward user eye 200, the clarity and/or accuracy of an image formed by the light may suffer, as discussed above.

Accordingly, a waveguide display assembly may include one or more diffractive gratings disposed along an optical path between the in-coupling grating and the out-coupling grating. In FIG. 3, these include diffractive gratings 302A-302F, disposed along an optical path 303 between the in-coupling and out-coupling gratings. The one or more diffractive gratings are configured to diffract light outside the first wavelength band out of the waveguide and away from the user eye. In FIG. 3, each of the diffractive gratings 302 direct some amount of light 300R out of the waveguide as waste light 300W, while substantially all of light 210R continues propagating through waveguide 208 toward the out-coupling grating.

In practical examples, it will be understood that some amount of light 210R may also be diffracted out of the waveguide by the diffractive gratings 302, and that not all of the light 300R may be diffracted out of the waveguide by the diffractive gratings 302. In general, however, use of one or more diffractive gratings as described herein may improve the ratio of intended wavelengths vs unintended wavelengths that are out-coupled toward the user eye, by diffracting much of the unintended light out of the waveguide before the out-coupling grating.

It will be understood that the specific quantity, spacing, and configuration of diffractive gratings 302A-302F shown in FIG. 3 is non-limiting. In other examples, a waveguide display assembly may include a different number of diffractive gratings (including only one), and may include diffractive gratings on other surfaces of the waveguide than the upper surface shown in FIG. 3. In general, a waveguide display assembly may include any suitable number of diffractive gratings, each separated by any suitable distance, and each disposed on any suitable surfaces of the waveguide.

Each diffractive grating may be implemented in any suitable way. As with the in-coupling and out-coupling gratings, the diffractive gratings will typically be implemented as a physical pattern printed or etched onto the waveguide surface in a way that controls light incident on the diffractive grating in an intended manner. For example, a diffractive grating may diffract particular wavelengths of light out of a waveguide, while allowing other wavelengths of light to continue propagating through the waveguide. Such functionality may be achieved by tuning any suitable optical properties of each diffractive grating. As non-limiting examples, such optical properties can include the spatial frequency of the gratings, an incident angle of the gratings, the geometry of the individual gratings and/or other properties.

In the example of FIG. 3, the light diffracted out of the waveguide by diffractive gratings 302A-302F (otherwise referred to as "waste light") goes in an opposite direction from the light 210 that is out-coupled toward the user eye. It will be understood, however, that the diffractive gratings may diffract light out of the waveguide in any suitable direction, although it is generally desirable that the waste light be directed such that it is not visible to the user eye. Thus, waste light 300W need not be diffracted out of the waveguide in the specific upwards direction shown in FIG. 3, but rather may be diffracted out of any suitable surface of the waveguide at any suitable angle.

In some examples, light outside the first wavelength band (e.g., the waste light) may be diffracted out of the waveguide and toward a waste-light area. The waste-light area may, for example, include an optically absorbent material to absorb the light outside the first wavelength band, thereby mitigating any potential visibility of the waste light to the user eye. The waste light may be diffracted directly from the waveguide into the waste-light area. Alternatively, the waste light may be steered toward the waste light area by one or more suitable optical elements of the waveguide display assembly. Any suitable optically absorbent material may be used—e.g., suitable plastics, rubbers, or coated/painted metals.

For example, in FIG. 3, the light outside of the first wavelength band (e.g., waste light 300W) is diffracted out of waveguide 208 and into a waste-light collection waveguide 304. From there, the waste-light collection waveguide directs light 300W to a waste-light area 306, including an optically absorbent material 308. In this manner, at least some of the light 300 that is in-coupled into waveguide 208 by in-coupling grating 212 may ultimately be absorbed by optically absorbent material 308, rather than being out-coupled toward user eye 200 along with light 210.

It will be understood that the specific arrangement of waveguide 208, waste-light collection waveguide 304, waste-light area 306, and optically absorbent material 308 shown in FIG. 3 is a non-limiting example. In practical scenarios, each of these components may have any suitable shapes, sizes, and spatial positions with respect to one another and the rest of waveguide display assembly 106. Furthermore, though no optical elements (e.g., in-coupling gratings or out-coupling gratings) are specifically shown on waste-light collection waveguide 304, it will be understood that such a waveguide may have any suitable combination of optical elements for accepting waste light and directing the waste light toward a waste-light area.

Turning now to FIG. 4, another schematic view of waveguide display assembly 106 is shown, in which some components depicted in FIG. 3 are omitted while other components are added. As shown in FIG. 4, the light source emits light 210 of a first wavelength band and light 300 of a second wavelength band toward waveguide 208, along with light of a third wavelength band 400. For example, light 210 may correspond to blue light, while light 300 corresponds to green light and light 400 corresponds to red light. Similar to FIG. 3, although FIG. 4 shows light emissions 210, 300, and 400 as being distinct and spatially-separate, the light source may in some cases emit a single beam of light toward the waveguide—e.g., the light source may emit full spectrum white light that includes light of the first, second, and third wavelength bands 210, 300, and 400.

Each of light 210, 300, and 400 are incident on in-coupling grating 212 of waveguide 208, and some amount of each wavelength band is in-coupled into the waveguide, resulting in propagation of light 210R, 300R, and 400R through the waveguide. As described above, waveguide 208 includes one or more diffractive gratings, including diffractive grating 302A, configured to diffract light outside the first wavelength band from the waveguide. Thus, as shown in FIG. 4, some amount of light 300 is diffracted out of the waveguide as waste light 300W, and some amount of light 400 is diffracted out of the waveguide as waste light 400W. Much of light 210 continues propagating through waveguide 208 until ultimately being out-coupled toward the user eye as light 210T.

The present disclosure has thus far primarily focused only on propagation of light through waveguide 208. As discussed above, however, a waveguide display assembly may in some cases include multiple different waveguides for directing different wavelength bands of light toward the user eye. For example, because in-coupling grating 212 selectively in-couples light of the first wavelength band, much of the light 300 of the second wavelength band and light 400 of the third wavelength band will pass through in-coupling grating 212. The waveguide display assembly may include additional waveguides configured to in-couple and steer these other wavelength bands of light.

For example, in FIG. 4, waveguide 208 is a first waveguide, and the waveguide display assembly further comprises a second waveguide 402 including a second in-coupling grating 404 configured to selectively in-couple light 300 of the second wavelength band. Specifically, in-coupling grating 404 in-couples at least some of the incident light 300 of the second wavelength band, while rejecting at least some of any incident light outside the second wavelength band. This results in propagation of light 300 within waveguide 402 as light 300R and, to a lesser extent, propagation of light 400 in waveguide 402 as light 400R. Some amount of light 210 of the first wavelength band may in some cases also be in-coupled by waveguide 402, although as will be discussed in more detail below, such light may in some cases be filtered out before reaching in-coupling grating 404.

Similar to waveguide 208, waveguide 402 includes an out-coupling grating 406 configured to outcouple light 300R of the second wavelength band toward user eye 200 as light 300R. To mitigate the amount of light 400R that is out-coupled by out-coupling grating 406, waveguide 402 also includes one or more diffractive gratings, including a diffractive grating 408A. These diffractive gratings may be configured to selectively diffract light outside the second wavelength band out of the waveguide (e.g., light 400R), while allowing light 300R of the second wavelength band to continue propagating through the waveguide via total internal reflection. Thus, in FIG. 4, some amount of light 400 of the third wavelength band is diffracted out of waveguide 402 as waste light 400W by diffractive grating 408A. Similar to waste light 300W described above with respect to FIG. 3, waste light 400W may be diffracted out of the waveguide and toward a waste-light area, and/or generally directed away from the user eye.

In FIG. 4, waveguide display assembly 106 also includes a third waveguide 410 including a third in-coupling grating 412 configured to selectively in-couple light 400 of the third wavelength band. Specifically, in-coupling grating 412 in-couples at least some of the incident light 400 of the third wavelength band, while rejecting at least some of any incident light outside the third wavelength band. This results in propagation of light 400 within waveguide 410 as light 400R. Waveguide 410 also includes an out-coupling grating 414 configured to out-couple light 400R from the waveguide toward the user eye as light 400T.

In some cases, some amount of light 210 and/or light 300 may also be in-coupled into waveguide 410. However, as will be described in more detail below, such light may in some cases be filtered before reaching in-coupling grating 412. In cases where substantial amounts of light 210 and/or light 300 is in-coupled into waveguide 410, the waveguide may include diffractive gratings similar to those of waveguides 208 and 402, although this is not shown in FIG. 4.

In the example of FIG. 4, the first waveguide 208, second waveguide 402, and third waveguide 410 are arranged in a stack, such that the first, second, and third in-coupling gratings 212, 404, and 412 are aligned with each other and with light source 206. It will be understood, however, that the various waveguides of the waveguide display assembly may have any suitable spatial arrangements with respect to one another, the light source, and any other components of the waveguide display assembly.

As discussed above, though in-coupling grating 212 selectively in-couples light 210 of the first wavelength band, some amount of light 210 may pass through the in-coupling grating without being in-coupled into the waveguide. Rather, such light may continue toward the second and third waveguides, where it may potentially be in-coupled and ultimately directed toward the user eye along with light of the second and/or third wavelength bands. This can introduce visual artifacts and/or negatively impact the clarity of the virtual images presented to the user eye, as discussed above.

Accordingly, in some examples, the waveguide display assembly may include a first color-specific filter disposed between the first waveguide and the second waveguide, and/or a second color-specific filter disposed between the second waveguide and the third waveguide. This is shown in FIG. 4, in which waveguide display assembly 106 includes a first color-specific filter 416 between waveguide 208 and waveguide 402. A second color-specific filter 418 is between waveguide 402 and waveguide 410.

Each color-specific filter may be configured to selectively filter one or more wavelengths of light, while passing other wavelengths of light. For example, first color-specific filter 416 may filter light 210 of the first wavelength band while passing light 300 of the second wavelength band and light 400 of the third wavelength band. This is schematically shown in FIG. 4, in which light 210 that passes through in-coupling grating 212 without being in-coupled into waveguide 208 does not reach in-coupling grating 404 of waveguide 402, as it is instead filtered by color-specific filter 416. Similarly, second color-specific filter 418 may be configured to filter light of the second wavelength band while passing light of the third wavelength band. In FIG. 4, light 300 that passes through in-coupling grating 404 without being in-coupled into waveguide 402 does not reach in-coupling grating 412 of waveguide 410, as it is instead filtered by color-specific filter 418.

The first and second color-specific filters may be implemented in any suitable way. In general, the first and second color-specific filters may take the form of any suitable optical elements that are useable to filter light of one or more wavelengths while passing light of other wavelengths. Furthermore, it will be understood that the specific shapes, sizes, and positions of the color-specific filters shown in FIG. 4 are non-limiting examples.

In some examples, light polarization may be used to mitigate cross coupling of light of different wavelength bands into the same waveguide. For example, the first in-coupling grating 212 may be configured to accept light having a first polarization direction (e.g., vertical) while rejecting at least some light having a second polarization direction, orthogonal to the first polarization direction (e.g., horizontal). In this example, the light source may emit light of the first wavelength band (e.g., blue light) and the third wavelength band (e.g., red light) with a vertical polarization direction, while light of the second wavelength band is emitted with a horizontal polarization direction. In this manner, while light of the first and third wavelength bands may have the correct polarization direction for in-coupling into the first waveguide, light of the second wavelength band may be substantially rejected. This may reduce the amount of the light of the second wavelength that is cross-coupled into the first waveguide.

Polarization-dependent in-coupling gratings may in some cases be used in tandem with optical elements configured to change the polarization direction of incident light. In some examples, these polarization-changing optical elements may be implemented as the first and/or second color-specific filters described above, and/or other suitable optical elements may instead be used. To continue with the above example, the first color-specific filter may be configured to rotate a current polarization direction of light passed by the first color-specific filter. In this manner, the polarity of the light of the second and third wavelength bands will be rotated as the light passes through the first color-specific filter. As a result, the light of the second wavelength band may have the correct polarization direction for in-coupling into the second waveguide when the light is incident on the second in-coupling grating, while light of the third wavelength band may be substantially rejected. The polarization direction of the light of the third wavelength band may again be rotated when the light passes through the second color-specific filter, causing the light to have the correct polarization direction for in-coupling into the third waveguide 410.

The present disclosure has described various approaches to mitigating the amount of light outside an intended wavelength band that is in-coupled into a waveguide and out-coupled toward a user eye. However, even when the above-described techniques are implemented, some amount of cross-coupling of light may still occur. For example, referring to the first waveguide 208, at least some light 300 or 400 outside the first wavelength band may be out-coupled by the out-coupling grating toward the user eye.

Any resulting negative effects on the virtual images displayed to the user eye may in some cases be corrected for in software by manipulating the image source. For example, the image controller may be configured to modify the virtual image formed by the light emitted by the light source to account for the out-coupling of the light outside the first wavelength band. Notably, when cross-coupling of light occurs, the resulting virtual image may include localized color uniformity issues—e.g., when red light is cross-coupled into a waveguide intended for blue light, it may cause a particular portion of the image (such as a corner) to have an overly-red appearance. The image controller may correct for this by, for example, instructing the light source to reduce the amount of red light used to form that part of the image, to correct for the excess red light out-coupled by the waveguide. It will be understood, however, that this is one non-limiting example scenario, and visual artifacts in a displayed image may be corrected for in software in any suitable way.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

FIG. 5 schematically shows a simplified representation of a computing system 500 configured to provide any to all of the compute functionality described herein. Computing system 500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. In some cases, HMD 102 described above may be implemented as computing system 500.

Computing system 500 includes a logic subsystem 502 and a storage subsystem 504. Computing system 500 may optionally include a display subsystem 506, input subsystem 508, communication subsystem 510, and/or other subsystems not shown in FIG. 5.

Logic subsystem 502 includes one or more physical devices configured to execute instructions. For example, the logic subsystem may be configured to execute instructions that are part of one or more applications, services, or other logical constructs. Image controller 204 may in some cases be implemented as logic subsystem 502. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 504 includes one or more physical devices configured to temporarily and/or permanently hold computer information such as data and instructions executable by the logic subsystem. When the storage subsystem includes two or more devices, the devices may be collocated and/or remotely located. Storage subsystem 504 may include volatile, nonvolatile, dynamic, static, read/write, read-only, random-access, sequential-access, location-addressable, file-addressable, and/or content-addressable devices. Storage subsystem 504 may include removable and/or built-in devices. When the logic subsystem executes instructions, the state of storage subsystem 504 may be transformed—e.g., to hold different data.

Aspects of logic subsystem 502 and storage subsystem 504 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 506 may be used to present a visual representation of data held by storage subsystem 504. In some embodiments, waveguide display assemblies 106L and 106R may be implemented as display subsystem 506. This visual representation may take the form of a graphical user interface (GUI). Display subsystem 506 may include one or more display devices utilizing virtually any type of technology. In some implementations, display subsystem may include one or more virtual-, augmented-, or mixed reality displays.

When included, input subsystem 508 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 510 may be configured to communicatively couple computing system 500 with one or more other computing devices. Communication subsystem 510 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a waveguide display assembly comprises: a waveguide including: an in-coupling grating configured to in-couple light of a first wavelength band emitted by a light source into the waveguide, and cause propagation of the light of the first wavelength band through the waveguide via total internal reflection; an out-coupling grating configured to out-couple the light of the first wavelength band from the waveguide and toward a user eye; and one or more diffractive gratings disposed along an optical path between the in-coupling grating and the out-coupling grating, the one or more diffractive gratings configured to diffract light outside the first wavelength band out of the waveguide and away from the user eye. In this example or any other example, the light outside the first wavelength band is diffracted out of the waveguide and toward a waste-light area. In this example or any other example, the waste-light area includes an optically absorbent material to absorb the light outside the first wavelength band. In this example or any other example, the light outside the first wavelength band is diffracted out of the waveguide and into a waste-light collection waveguide, the waste-light collection waveguide configured to direct the light outside the first wavelength band toward the waste-light area. In this example or any other example, the in-coupling grating is configured to selectively in-couple light of the first wavelength band while rejecting at least some light outside the first wavelength band. In this example or any other example, the waveguide is a first waveguide, and the waveguide display assembly further comprises a second waveguide including a second in-coupling grating configured to selectively in-couple light of a second wavelength band, and a third waveguide including a third in-coupling grating configured to selectively in-couple light of a third wavelength band. In this example or any other example, the first wavelength band corresponds to blue light, the second wavelength band corresponds to green light, and the third wavelength band corresponds to red light. In this example or any other example, the first waveguide, the second waveguide, and the third waveguide are arranged in a stack such that the first, second, and third in-coupling gratings are aligned with each other and with the light source. In this example or any other example, the waveguide display assembly further comprises a first color-specific filter disposed between the first waveguide and the second waveguide, and a second color-specific filter disposed between the second waveguide and the third waveguide. In this example or any other example, the first color-specific filter is configured to filter light of the first wavelength band while passing light of the second wavelength band and the third wavelength band, and wherein the second color-specific filter is configured to filter light of the second wavelength band while passing light of the third wavelength band. In this example or any other example, the first in-coupling grating is configured to in-couple light having a first polarization direction while rejecting at least some light having a second polarization direction, orthogonal to the first polarization direction. In this example or any other example, the first color-specific filter is configured to rotate a current polarization direction of light passed by the first color-specific filter, and the second color-specific filter is configured to rotate a current polarization direction of light passed by the second color-specific filter. In this example or any other example, the waveguide display assembly further comprises an image controller configured to control activity of the light source, such that light emitted by the light source toward the waveguide forms a virtual image for viewing by the user eye. In this example or any other example, at least some light outside the first wavelength band is out-coupled by the out-coupling grating toward the user eye, and the image controller is further configured to modify the virtual image formed by the light emitted by the light source to account for the out-coupling of the light outside the first wavelength band.

In an example, a display device comprises: a light source configured to emit light; an image controller configured to control activity of the light source, such that the light emitted by the light source forms a virtual image for viewing by a user eye; and a waveguide display assembly, comprising: a waveguide, including: an in-coupling grating configured to in-couple light of a first wavelength band emitted by the light source into the waveguide, and cause propagation of the light of the first wavelength band through the waveguide via total internal reflection; an out-coupling grating configured to out-couple the light of the first wavelength band from the waveguide and toward the user eye; and one or more diffractive gratings disposed along an optical path between the in-coupling grating and the out-coupling grating, the one or more diffractive gratings configured to diffract light outside the first wavelength band out of the waveguide and away from the user eye. In this example or any other example, the light outside the first wavelength band is diffracted out of the waveguide and toward a waste-light area. In this example or any other example, the waveguide is a first waveguide, and the waveguide display assembly further comprises a second waveguide including a second in-coupling grating configured to selectively in-couple light of a second wavelength band, and a third waveguide including a third in-coupling grating configured to selectively in-couple light of a third wavelength band. In this example or any other example, the first waveguide, the second waveguide, and the third waveguide are arranged in a stack such that the first, second, and third in-coupling gratings are aligned with each other and with the light source, and wherein the waveguide display assembly further comprises a first color-specific filter disposed between the first waveguide and the second waveguide, and a second color-specific filter disposed between the second waveguide and the third waveguide. In this example or any other example, the second in-coupling grating is configured to in-couple light having a first polarization direction while rejecting at least some light having a second polarization direction, orthogonal to the first polarization direction.

In an example, a waveguide display assembly comprises: a first waveguide, including: a first in-coupling grating configured to in-couple light of a first wavelength band emitted by a light source into the first waveguide, and cause propagation of the light of the first wavelength band through the first waveguide via total internal reflection; a first out-coupling grating configured to out-couple the light of the first wavelength band from the first waveguide and toward a user eye; and one or more first diffractive gratings disposed along an optical path between the first in-coupling grating and the first out-coupling grating, the one or more first diffractive gratings configured to diffract light outside the first wavelength band out of the first waveguide and away from the user eye; and a second waveguide, including: a second in-coupling grating configured to in-couple light of a second wavelength band emitted by the light source into the second waveguide, and cause propagation of the light of the second wavelength band through the second waveguide via total internal reflection; a second out-coupling grating configured to out-couple the light of the second wavelength band from the second waveguide and toward the user eye; and one or more second diffractive gratings disposed along an optical path between the second in-coupling grating and the second out-coupling grating, the one or more second diffractive gratings configured to diffract light outside the second wavelength band out of the second waveguide and away from the user eye.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A waveguide display assembly, comprising:
   a waveguide, including:
   an in-coupling grating configured to in-couple light of a first wavelength band emitted by a light source into the waveguide, and cause propagation of the light of the first wavelength band through the waveguide via total internal reflection;
   an out-coupling grating configured to out-couple the light of the first wavelength band from the waveguide and toward a user eye; and
   one or more diffractive gratings disposed along an optical path between the in-coupling grating and the out-coupling grating, the one or more diffractive gratings configured to diffract light outside the first wavelength band out of the waveguide and into a waste-light collection waveguide, the waste-light collection waveguide configured to direct the light outside the first wavelength band away from the user eye.

2. The waveguide display assembly of claim 1, wherein the light outside the first wavelength band is directed by the waste-light collection waveguide toward a waste-light area.

3. The waveguide display assembly of claim 2, wherein the waste-light area includes an optically absorbent material to absorb the light outside the first wavelength band.

4. The waveguide display assembly of claim 1, wherein the in-coupling grating is configured to selectively in-couple light of the first wavelength band while rejecting at least some light outside the first wavelength band.

5. The waveguide display assembly of claim 4, wherein the waveguide is a first waveguide, and the waveguide display assembly further comprises a second waveguide including a second in-coupling grating configured to selectively in-couple light of a second wavelength band, and a third waveguide including a third in-coupling grating configured to selectively in-couple light of a third wavelength band.

6. The waveguide display assembly of claim 5, wherein the first wavelength band corresponds to blue light, the second wavelength band corresponds to green light, and the third wavelength band corresponds to red light.

7. The waveguide display assembly of claim 5, wherein the first waveguide, the second waveguide, and the third waveguide are arranged in a stack such that the first, second, and third in-coupling gratings are aligned with each other and with the light source.

8. The waveguide display assembly of claim 5, further comprising a first color-specific filter disposed between the first waveguide and the second waveguide, and a second color-specific filter disposed between the second waveguide and the third waveguide.

9. The waveguide display assembly of claim 8, wherein the first color-specific filter is configured to filter light of the first wavelength band while passing light of the second wavelength band and the third wavelength band, and wherein the second color-specific filter is configured to filter light of the second wavelength band while passing light of the third wavelength band.

10. The waveguide display assembly of claim 8, wherein the first in-coupling grating is configured to in-couple light having a first polarization direction while rejecting at least some light having a second polarization direction, orthogonal to the first polarization direction.

11. The waveguide display assembly of claim 10, wherein the first color-specific filter is configured to rotate a current polarization direction of light passed by the first color-specific filter, and the second color-specific filter is configured to rotate a current polarization direction of light passed by the second color-specific filter.

12. The waveguide display assembly of claim 1, further comprising an image controller configured to control activity of the light source, such that light emitted by the light source toward the waveguide forms a virtual image for viewing by the user eye.

13. The waveguide display assembly of claim 12, wherein at least some light outside the first wavelength band is out-coupled by the out-coupling grating toward the user eye, and the image controller is further configured to modify the virtual image formed by the light emitted by the light source to account for the out-coupling of the light outside the first wavelength band.

14. A display device, comprising:
a light source configured to emit light;
an image controller configured to control activity of the light source, such that the light emitted by the light source forms a virtual image for viewing by a user eye; and
a waveguide display assembly, comprising:
a waveguide, including:
an in-coupling grating configured to in-couple light of a first wavelength band emitted by the light source into the waveguide, and cause propagation of the light of the first wavelength band through the waveguide via total internal reflection;
an out-coupling grating configured to out-couple the light of the first wavelength band from the waveguide and toward the user eye; and
one or more diffractive gratings disposed along an optical path between the in-coupling grating and the out-coupling grating, the one or more diffractive gratings configured to diffract light outside the first wavelength band out of the waveguide and into a waste-light collection waveguide, the waste-light collection waveguide configured to direct the light outside the first wavelength band away from the user eye.

15. The display device of claim 14, wherein the light outside the first wavelength band is directed by the waste-light collection waveguide toward a waste-light area.

16. The display device of claim 14, wherein the waveguide is a first waveguide, and the waveguide display assembly further comprises a second waveguide including a second in-coupling grating configured to selectively in-couple light of a second wavelength band, and a third waveguide including a third in-coupling grating configured to selectively in-couple light of a third wavelength band.

17. The display device of claim 16, wherein the first waveguide, the second waveguide, and the third waveguide are arranged in a stack such that the first, second, and third in-coupling gratings are aligned with each other and with the light source, and wherein the waveguide display assembly further comprises a first color-specific filter disposed between the first waveguide and the second waveguide, and a second color-specific filter disposed between the second waveguide and the third waveguide.

18. The display device of claim 16, wherein the second in-coupling grating is configured to in-couple light having a first polarization direction while rejecting at least some light having a second polarization direction, orthogonal to the first polarization direction.

19. A waveguide display assembly, comprising:
a first waveguide, including:
a first in-coupling grating configured to in-couple light of a first wavelength band emitted by a light source into the first waveguide, and cause propagation of the light of the first wavelength band through the first waveguide via total internal reflection;
a first out-coupling grating configured to out-couple the light of the first wavelength band from the first waveguide and toward a user eye; and
one or more first diffractive gratings disposed along an optical path between the first in-coupling grating and the first out-coupling grating, the one or more first diffractive gratings configured to diffract light outside the first wavelength band out of the first waveguide and into a waste-light collection waveguide, the waste-light collection waveguide configured to direct the light outside the first wavelength band away from the user eye; and
a second waveguide, including:

a second in-coupling grating configured to in-couple light of a second wavelength band emitted by the light source into the second waveguide, and cause propagation of the light of the second wavelength band through the second waveguide via total internal reflection;

a second out-coupling grating configured to out-couple the light of the second wavelength band from the second waveguide and toward the user eye; and one or more second diffractive gratings disposed along an optical path between the second in-coupling grating and the second out-coupling grating, the one or more second diffractive gratings configured to diffract light outside the second wavelength band out of the second waveguide and into the waste-light collection waveguide, the waste-light collection waveguide configured to direct the light outside the second wavelength band away from the user eye.

* * * * *